(12) United States Patent
Franzius et al.

(10) Patent No.: US 9,864,376 B2
(45) Date of Patent: Jan. 9, 2018

(54) CONTROL SYSTEM FOR AN AUTONOMOUS VEHICLE AND A METHOD FOR GENERATING A CONTROL SIGNAL AND AUTONOMOUS VEHICLE EQUIPPED WITH SUCH CONTROL SYSTEM

(71) Applicant: HONDA RESEARCH INSTITUTE EUROPE GMBH, Offenbach/Main (DE)

(72) Inventors: Mathias Franzius, Offenbach (DE); Nils Einecke, Offenbach (DE)

(73) Assignee: HONDA RESEARCH INSTITUTE EUROPE GMBH, Offenbach Main (DE)

( * ) Notice: Subject to any disclaimer, the term of this patent is extended or adjusted under 35 U.S.C. 154(b) by 275 days.

(21) Appl. No.: 14/955,170

(22) Filed: Dec. 1, 2015

(65) Prior Publication Data
US 2016/0195877 A1 Jul. 7, 2016

(30) Foreign Application Priority Data
Jan. 7, 2015 (EP) .................................... 15150272

(51) Int. Cl.
*G05D 1/02* (2006.01)
*H04N 5/232* (2006.01)
(Continued)

(52) U.S. Cl.
CPC ......... *G05D 1/0231* (2013.01); *A01D 34/008* (2013.01); *G05D 1/0088* (2013.01); *G06K 9/00805* (2013.01); *G06K 9/20* (2013.01); *G06K 9/38* (2013.01); *H04N 5/23229* (2013.01); *H04N 5/23245* (2013.01); *H04N 13/0239* (2013.01)

(58) Field of Classification Search
CPC ....... G05D 1/0231; A01D 34/008; G06K 9/38
See application file for complete search history.

(56) References Cited

U.S. PATENT DOCUMENTS

2015/0166062 A1* 6/2015 Johnson ................ B60W 30/12
701/41

FOREIGN PATENT DOCUMENTS

EP 2 620 050 A1 7/2013

OTHER PUBLICATIONS

European Search Report dated Jun. 22, 2015 corresponding to European Patent Application No. 15150272.1.
(Continued)

*Primary Examiner* — Nam Pham
(74) *Attorney, Agent, or Firm* — Squire Patton Boggs (US) LLP

(57) ABSTRACT

The invention relates to a control system for an autonomous vehicle, a method and an autonomous vehicle. The system comprises an image capturing means capable of capturing at least a first image of the environment of the vehicle and a second image of the environment, wherein the images are captured in a close time relationship but with different image capturing parameters. A processing means configured to obtain and process the images captured with different image capturing parameters separately and taking into consideration a first intensity threshold when processing the first image and a second, different intensity threshold when processing the second image. A control means for generating and outputting a control signal on the basis of a result of the at least one of the processed images.

24 Claims, 5 Drawing Sheets

(51) Int. Cl.
*G06K 9/00* (2006.01)
*H04N 13/02* (2006.01)
*G05D 1/00* (2006.01)
*G06K 9/20* (2006.01)
*G06K 9/38* (2006.01)
*A01D 34/00* (2006.01)

(56) References Cited

OTHER PUBLICATIONS

Zuyun Zhao, "Complementary Imaging for Pavement Cracking Measurements," Master Thesis, Dec. 1, 2014, XP55194878, The University of Texas at Austin, retrieved from the Internet: http://repositories.lib.utexas.edu/bitstream/handle/2152/28276/ZHAO-THESIS-2014.

Alexander Schepelmann et al., "Visual Segmentation of Lawn Grass for a Mobile Robotic Lawnmower," Intelligent Robots and Systems (IROS), 2010 IEEE/RSJ International Conference, Oct. 18, 2010, pp. 734-739, XP031920389.

* cited by examiner

CONTROL SYSTEM FOR AN AUTONOMOUS VEHICLE AND A METHOD FOR GENERATING A CONTROL SIGNAL AND AUTONOMOUS VEHICLE EQUIPPED WITH SUCH CONTROL SYSTEM

BACKGROUND

Field

The present invention relates to a system and a method for an autonomous vehicle. Such an autonomous vehicle may in particular be a self-propelled lawn mower or service robot such as a vacuum cleaner. Particularly, the control system and corresponding method and vehicle relate to the generation of control signals for finding a travel path where recognizing obstacles in the travel path is difficult due to difficult light conditions.

Description of the Related Art

The use of autonomous vehicles that assist people in performing work such as cleaning buildings or mowing a lawn is already known in the art. Initially, the autonomous vehicles have been guided by using for example a wiring that indicates the edges of an area where the autonomous vehicle can travel on its own. This is a great increase in comfort for a user, because he does not need to supervise the autonomous vehicle at any time of operation. But of course, the edges of an area to be mowed or where vacuum cleaning shall be performed are not the only boundaries. In particular, lawn mowers need to react on obstacles that are on a lawn such as toys that children playing on the lawn have left there. Early attempts used bump sensors to detect such obstacles. In case that a collision is recognized between the autonomous vehicle and the obstacles the direction of travel will be changed and thus, it is avoided that the autonomous vehicle is manoeuvred to a dead end. But of course there may be obstacles that cannot be sensed by such bump sensors, because there are flat obstacles lying in the grass, or on the ground in case of a vacuum cleaner. An example may be a mobile telephone the height of which is not sufficient in order to cause a collision and thus, the bump sensor to recognize the obstacle.

Thus, image processing systems were developed that use a camera for capturing images of the environment, in particular in the direction of travel of the autonomous vehicle. Obstacle detection algorithms have been developed which are capable of determining an object that lies in the travel path of the autonomous vehicle on the basis of the captured images. The vehicle is equipped with an image capture means that captures a sequence of images and provides then to a processing means which then detects an obstacle by distinguishing areas that are not recognized as grass or ground.

The problem of such obstacle detection systems is, however, that the light conditions under which the images are captured may be difficult in particular if the autonomous vehicle is intended for outdoor use. For example, during day time there may be sufficient light in order to recognize obstacles based on the mentioned detection algorithms, but in the evening when it gets darker, the obstacles may not be recognized reliably. Image capturing means such as video cameras may then be adapted to increase an exposure time in order to achieve an image with a sufficient intensity over all the pixels of the image. But still there are some problems to detect objects with a sufficient reliability in case that the light conditions are not similar in the entire area of the environment which is captured by the image capturing means. For example, in bright sunlight there is a big difference between areas where a shadow is and an area which lies in bright sunlight.

Being aware of such problematic light conditions, new systems have been developed as for example described in EP 2 620 050 A1. Here it is suggested to adapt the setting of the camera. In addition, an additional light source may be used which is switched on, if the environment becomes too dark and thus, the autonomous vehicle travels along a path where the light conditions change sufficient illumination of the area can be achieved. The adaptation of the camera setting with respect to exposure time and gain can be performed in a time series manner. But still images that at the same time shall provide information about dark areas and bright areas are problematic. One attempt to solve this problem is using a so-called bracketing technique in which two images are taken with different camera settings, one optimized for the dark area and one for the bright area. Based on these two images that are taken with different camera settings, a so-called HDR-image is generated. But known HDR-techniques combine the two images that are taken at different camera settings and generate one single HDR image which is then used for further analysis. Doing so causes artifacts in the combined HDR-image and therefore, detection of obstacles that for example lie at the boundary between the dark area and the bright area may still be difficult, because artifacts in particular occur at these boundaries. Although there are known a plurality of different approaches for generating such an HDR-image, they all suffer from the same problem that a single image is provided which is a combination of areas that have been illuminated differently.

This is in particular obvious when the camera that takes the different pictures is moving and thus there is time difference between the two images that are to be combined. Here, it becomes perfectly clear that the combined image will include artifacts which then of course cause problems during the further processing of the image.

SUMMARY

Thus, it is an object of the present invention to provide a control system, a method and an autonomous vehicle that are capable of generating control signals on the basis of captured images in difficult light conditions where the performance of the system is not badly affected by artifacts.

This problem is solved by the control system, the method and the autonomous vehicle according to the invention. According to the present invention, the image capturing means is provided which is capable of capturing a first image of the environment of the autonomous vehicle and a second image of the environment at least. Of course, it is also possible that a sequence comprising at least the mentioned two images is taken. The images are captured in a close time relationship, but with different image capturing parameters. These image capturing parameters are adapted so that dark areas in the captured environment are illuminated sufficiently and with the second image the bright areas are not overexposed. The images are captured in close time relationship which means that they basically capture an image of the same environment of the vehicle. The close time relationship may be ensured by taking successive images of a video camera or even capturing two images at the same time. According to the invention, the two images with different image capturing parameters are processed separately by a processing means. During the processing a first intensity threshold is taken into consideration when the first image is processed and a second, intensity threshold is used when the second image processed. The thresholds are adapted so that only pixels with intensity values that deliver valuable information of the environment are taken into consideration for the further processing. For example if the first image is a dark image which ensures that no overexposed areas are included in the image, only pixels that have an intensity value that is above the first intensity threshold are used for the final evaluation of the information in the image. Thus, areas of such low intensity image that have pixels with a low intensity value do not contribute to the generation of the control system which is finally used to control the path of movement of the autonomous vehicle. On the other side, the second image that is captured in order to sufficiently image the darker areas of the environment, will necessarily show areas with a high exposure. Thus, here only pixels that have an intensity value below the second threshold are taken into consideration for further processing.

With the present invention it can be avoided that the two images that are captured with different settings in order to achieve information about the entire caption area of environment, are combined at first and then the combined picture is used for further processing. Artifacts that occur due to the combination of the two images therefore cannot cause any trouble in further processing and evaluation.

It is in particular preferred that the image capturing means which are used to capture the two images with different setting is a stereo camera. By doing so, it can be ensured that the close time relationship is maintained, since it is possible to capture both images at the same time.

Furthermore, it is preferred to have a camera controller in the system which applies a first parameter set to the one camera of the stereo camera and a second parameter set to the other camera of the stereo camera. Thus, with such controller simultaneously the two cameras of the stereo camera can be used for an image capturing on the basis of two distinct parameter sets. One of these sets is adapted for the dark areas and the other one for the bright areas.

Furthermore, the system preferably captures two images using a bracketing technique.

According to another example, the system can capture the two images on the basis of the set parameters in an alternative fashion which means that an image with a high intensity and an image with a low intensity are captured alternatingly. In that case, the use of a stereo camera is not necessary and a single camera may be used as image capturing means. Thus, a video camera having only one lens and one chip for image capturing can be used, but nevertheless two individual images are captured, wherein these two images constitute a pair of images still in close time relationship, but delivering information on dark areas as well as on bright areas.

For detecting obstacles, it is furthermore preferred to perform as image processing a grass segmentation algorithm. This grass segmentation is performed individually for the first captured image and the second captured image without at first combining the two images to an HDR-image. For such grass segmentation for example the pixels that are below the first threshold in the first captured image which is a dark image and pixels of the second captured image which is the high intensity image and where the pixels have intensity values above the second intensity threshold can be ignored without badly affecting the algorithm of grass segmentation processing.

For ignoring pixels having intensity values below the first threshold and above the second threshold respectively in the two captured images, it is also possible to at first perform an obstacle detection individually for the first captured image and the second captured image and then to determine if the detected obstacles have been detected with sufficient reliability. Here for further processing only obstacles that have been determined are taken into further consideration where the number of pixels corresponding to the detected obstacle but which lie under the first intensity threshold are further evaluated. The same can be performed for obstacles the corresponding pixels of which have intensity values that lie above the second threshold. If for example a quantization of the intensity values between 0 . . . 255 these two thresholds ensure that intensity values close to zero in the dark image and intensity values close to 255 in the high intensity image do not contribute to the generation of the control signal because they do not provide reliable and valuable information. The dark pixels with intensity values close to zero for example suffer from noise and therefore a determination result based on such pixels does not provide sufficient reliability. On the other side, pixels that are close to 255 with their intensity values are so close to overexposure that there also no reliable information can be used for the detection process.

Furthermore, it is preferred that the control signal includes commands for controlling a movement means of the autonomous vehicle. The control system comprises such movement means and controls the actual movement of the vehicle by providing the control signal to the movement means. Based on the detection result, in particular the detected obstacles, it is thus possible to generate a control signal so that the movement means are controlled to drive along a path where no obstacles are present.

The image capturing parameters preferably include at least exposure or a gain or a combination thereof. These parameters may be adapted in most of the known camera systems so that known camera systems can be used easily in the control system according to the present invention.

According to another advantageous aspect of the invention the processing means is configured to combine the processed first image and the processed second image. Thus, for further prosecution there is again only one image that is to be further processed but before the combination is carried out pixels with insufficient information reliability are already eliminated. Thus, with the combined image according to the invention no artifacts may cause errors in evaluation and further processing. It is preferred that the autonomous vehicle which is equipped with movement means and the control system is a service robot or an autonomous lawn mower. The present invention will be explained in detail the following description taking into consideration the annexed drawings.

BRIEF DESCRIPTION OF THE DRAWINGS

In the drawings there is shown in

DETAILED DESCRIPTION

The following description and explanation refer to a situation where an autonomous lawn mower is used. Of course it is evident that any details which are discussed in the following may also be used in other autonomous garden tools or other autonomous vehicles in general such as service robots, for example vacuum cleaners.

Figure 1:
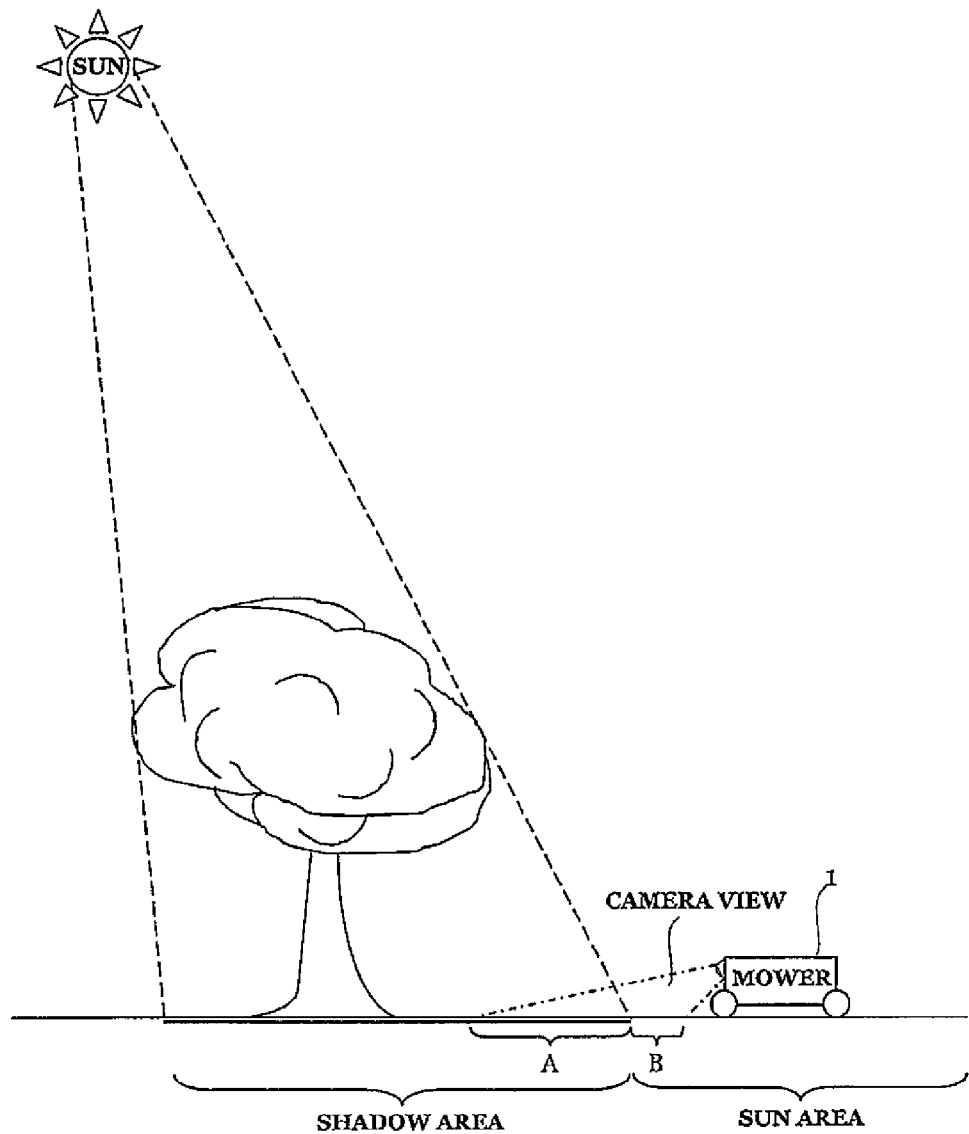
FIG. 1 a situation in which reliability of the results of obstacle detection needs to be improved over the prior art.

FIG. 1 shows a situation in which according to previous proposals for obstacle detection problems may occur. Although it is known that camera sensors are used to implement the intelligent functions like obstacle avoidance sometimes the results of the image processing are poor. As explained already in the introductory portion the reason for this is that good image quality is needed so that evaluation gives a reliable result. As long as the light conditions vary only with respect to time, for example when dawn is breaking, there is no problem to adapt the settings of a camera. Adapting the settings like exposure time and gain factor can compensate for the changing light conditions. But there are some situations where different areas in the same image would need to be adapted differently. This is the case in the situation shown in FIG. 1 where the contrast within the single captured image is so high that there may be present overexposed areas and areas which are too dark to perform a meaningful evaluation. For example a tree that casts a strong shadow in summertime when the sun is to bright may cause such problems. The camera sensor can only capture one image at a time using the same settings irrespective if the sun area or a shadow area is imaged. In that case the limiting factor is the dynamic range of the camera within one frame. The resulting picture thus will have either an underexposed area A and a visible area B when a moderate exposure time or gain is used or a visible area A and an overexposed area B when exposure time or gain is increased. Since such a poor imaging result will necessarily lead to a bad performance of any functions that depends on such an image it is suggested according to the invention that only those pixels that contain information which is useful for evaluation are taken into consideration.

Figure 2:
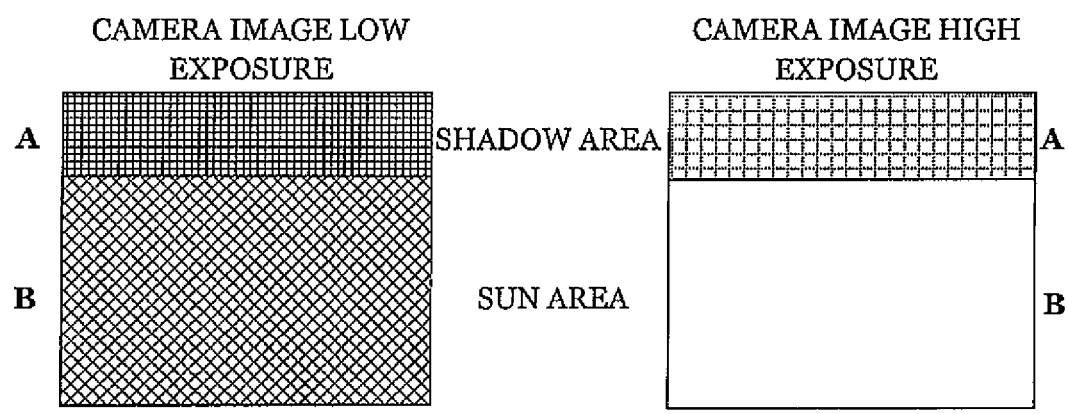
FIG. 2 an overview over the control system according to the present invention.

Referring to the above-mentioned example two distinct images are captured. These two images should be in close time relationship which means that they are either successive images of a video stream or taken at the same time if a stereo camera is used. In any case a pair of images is provided showing basically the same portion of the environment but one image is captured with a setting like exposure time and gain suitable to result in a visible area A and the second image is captured with a camera setting suitable to result in a visible area B. The schematic of such two pictures forming a pair of pictures is shown in FIG. 2. From FIG. 2 it is clear that the area designated with A in the left picture which is a camera image captured with a low exposure time and gain does not give any information which might be useful when a obstacle detection algorithm is performed. For the area designated with B which is the area lying in bright sunlight of FIG. 1 gives all the detailed information necessary for further processing because exposure time and gain is optimized for that part of the lawn that lies in bright sunlight. The right image which is a camera image taken with high exposure time and gain on the other side is optimized so that the shadow area A shows all the details that are necessary for further processing and evaluation whereas the sun area B is overexposed so that no proper evaluation can be made in that part of the high exposure image.

Figure 3:
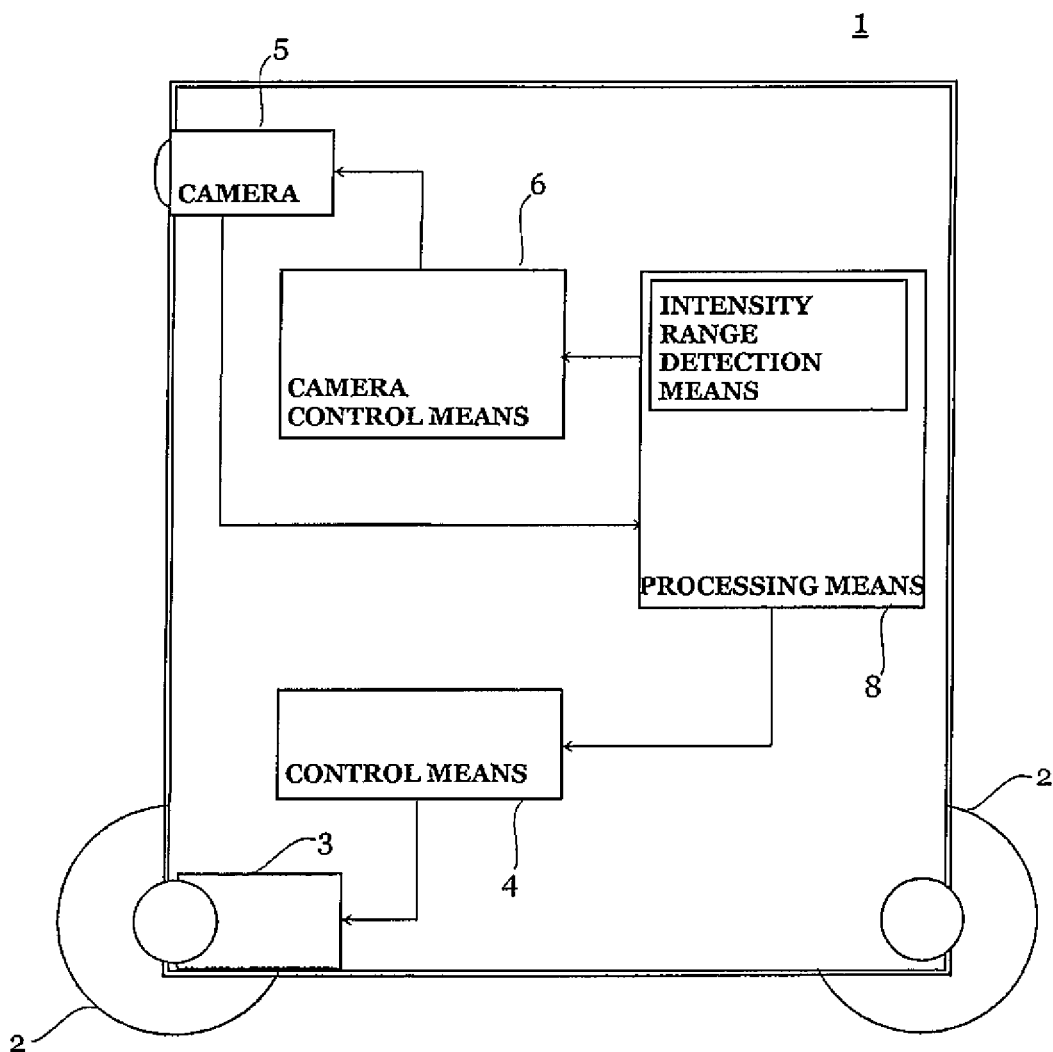
FIG. 3 a schematic to illustrate the difference between the first captured image and the second captured image.

Before the independent processing of the two images is explained in detail the overall layout of an autonomous lawn mower as an example for an autonomous vehicle comprising the inventive control system for performing the inventive method is shown. FIG. 3 shows the autonomous lawn mower 1 comprising front and rear wheels 2. At least a part of the front and rear wheels is driven by at least one electric motor 3. The electric motor 3 is controlled by a control means 4 so that the direction and speed of the autonomous lawn mower is controlled. Thus, if an obstacle of an area to be mowed is detected, the control means 4 controls the electric motor 3 in such a way that a collision with the obstacle can be avoided. The present description only details with respect to a processing of images that are captured by a camera 5 are taken into consideration. The obstacle detection itself is well known in the art and may of course also in addition to the presently presented control system be used in order to provide the control means 4 with information regarding areas where the autonomous lawn mower 1 may not drive through.

The camera 5 is an example for an image capturing means which may either be a single camera capable of taking a series of images such as for example 25 images per second or more so that two consecutive images may be considered as being in close time relationship. Alternatively, the camera 5 is a stereo camera comprising two cameras included in one unit but the two cameras each provide a lens system and a chip so that different setting parameters can be applied to the two cameras of the stereo camera.

The camera 5 is capable of using different settings when capturing images and is therefore connected to a camera control means 6. With the camera control means camera settings like exposure time and/or gain and/or aperture may be set individually for each single image. In case that camera 5 takes the two images that form a pair of images according to the invention, camera settings may be adapted from image to image so that high exposure images and low exposure images are captured in an alternative fashion. As mentioned above, the camera 5 may be a stereo camera and thus the individual cameras of the stereo camera can be set to different parameters. As a consequence two images, one being a high exposure image and one being a low exposure image, can be captured at the same time.

Each image that is captured by the camera 5 is transferred to the processing means 8. In the processing means algorithms for recognition of obstacles or grass recognition or the like are performed.

In order to determine the camera settings that are necessary so that camera 5 is capable of providing two images with different guiding the processing means includes an intensity range detection means. The intensity range detection means is capable of analyzing a single frame image so is to determine whether the contrast in a captured image is so high that no suitable further processing of such image can be achieved. It is to be noted that the control system according to the invention does not necessarily always provide images captured at different camera parameter settings but also can in a known manner perform an analysis on the basis of a single picture in case that for example the single picture an image of only a part that fully lies in the sun area or fully lies in the shadow area of FIG. 1.

But in case that the result of a processing in the intensity range detection means shows that the contrast within one image is so high that an adaptation of the camera parameter settings is necessary an information signal is transmitted to the camera control means 6. As a consequence the camera control means 6 causes the camera 5 to capture pairs of images wherein each image of the pair of images is captured with adapted parameter settings. The adaptation of the parameter settings causes one picture to be a high exposure picture which means that for example the camera parameters exposure and/or gain and/or aperture are set to value to insure that the darker areas of the image area of the environment are sufficiently bright in the resulting image. This sufficient brightness means that the entire image has average intensity values for the pixels and is thus also called the high intensity image. The second image of the other side is adapted to the bright areas in the captured area of the environment which means that exposure time and/or gain and/or aperture are set to values so that an over exposure in the bright areas is avoided. As a result the average intensity values of the pixels of this image are relatively low and thus this image is a so-called low intensity image. The two images captured by camera 5 are provided to the processing means where the further processing of the two images is performed independently.

It is to be noted that because of the intensity range detection means causing the camera 5 to take pairs of pictures at different settings the processing means 8 is aware of a switch between image capturing modes between a normal mode where each image can be processed with respect to its entire information and the mode according to the current invention where two images forming a pair of images are processed individually so that in each image only those parts of the image are further processed or evaluated which provide valuable information.

FIG. 3 shows a schematic to illustrate the different steps of the image processing according to the present invention. At first a low intensity camera image is acquired which is sent to the image processing means 8. The processing means 8 starts processing as soon as it receives such first image and during processing the low intensity image pixels with intensity values that are below $\sigma_1$ are ignored. In the present example it is assumed that in fact the information of the individual pixels are taken into consideration for for example an obstacle detection algorithm in case that the intensity values are at least equal to $\sigma_1$. After performing such an obstacle detection algorithm any evaluation on the obstacles on the first captured image is performed and a control signal is generated by the control means 4. The control signal includes information that is suitable to control the operation of the electric motor 3 in such a way that speed and direction of travel of the lawn mower 1 are controlled.

Then the next image that is captured by camera 5 is a high intensity camera image and the same processing as explained with respect to the low intensity camera image is performed here with difference that during the processing of the high intensity image pixels are ignored the intensity values of which are higher than $\sigma_2$. The processed image is then again used to evaluate and send a motor command which means that a control signal is generated for controlling the electric motor 3.

Thus the two images that are taken at different settings are processed completely individually and each of the images provides its own evaluation result which is the basis for generation of the control signal.

The process as explained above may be slightly adapted. Instead of skipping information of pixels below $\sigma_1$ for the first captured image or higher than $\sigma_2$ for the second captured image it is also possible to perform the obstacle detection algorithm at first and then decide for each detected obstacle if the information about the presence of such obstacle is used for further evaluation. This means that in case an obstacle is detected in the first captured image it is checked if the pixels that correspond to the detected obstacle in the first captured image include pixels with intensity values that are lower than $\sigma_1$. If so the number of such pixels having a lower intensity value than $\sigma_1$ are counted and if the number of counted pixels exceeds either a fixed threshold for such number of pixels or a certain ratio of pixels with respect to the entire number of pixels corresponding to the detected obstacle this detected object will be ignored during further processing in particular the evaluation and generation of the control signal.

The same is performed with respect to the second captured image being the high intensity camera image. Again if obstacles are detected on the basis of all the pixels of the second captured image it is then counted the number of pixels with intensity values higher than $\sigma_2$ that correspond to the detected obstacle. Again a fixed threshold may be used for the ration of the pixels with intensity values higher then $\sigma_2$ relative to the entire number of pixels corresponding to the detected obstacle may be used.

Figure 4:
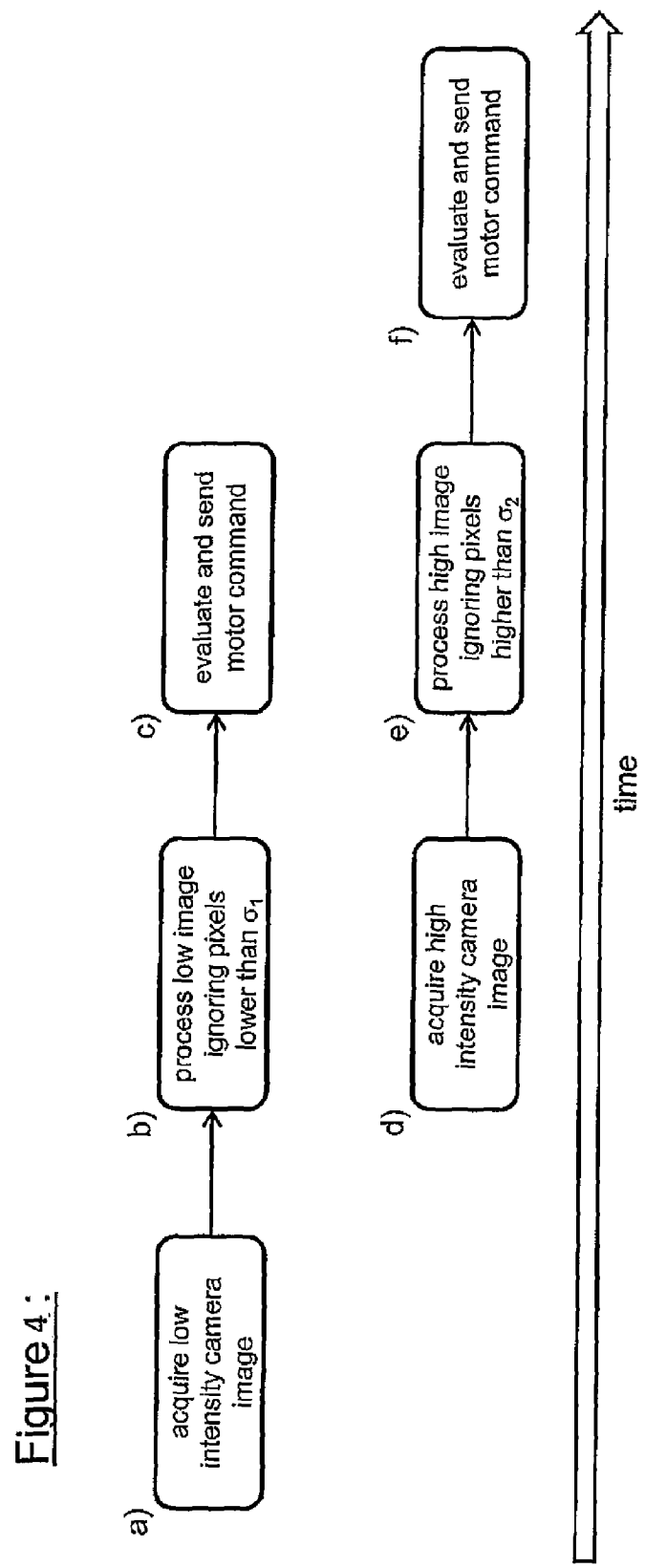
FIG. 4 a timeline for explanation of the individual processing of a low intensity camera image and a high intensity camera image.
Figure 5:
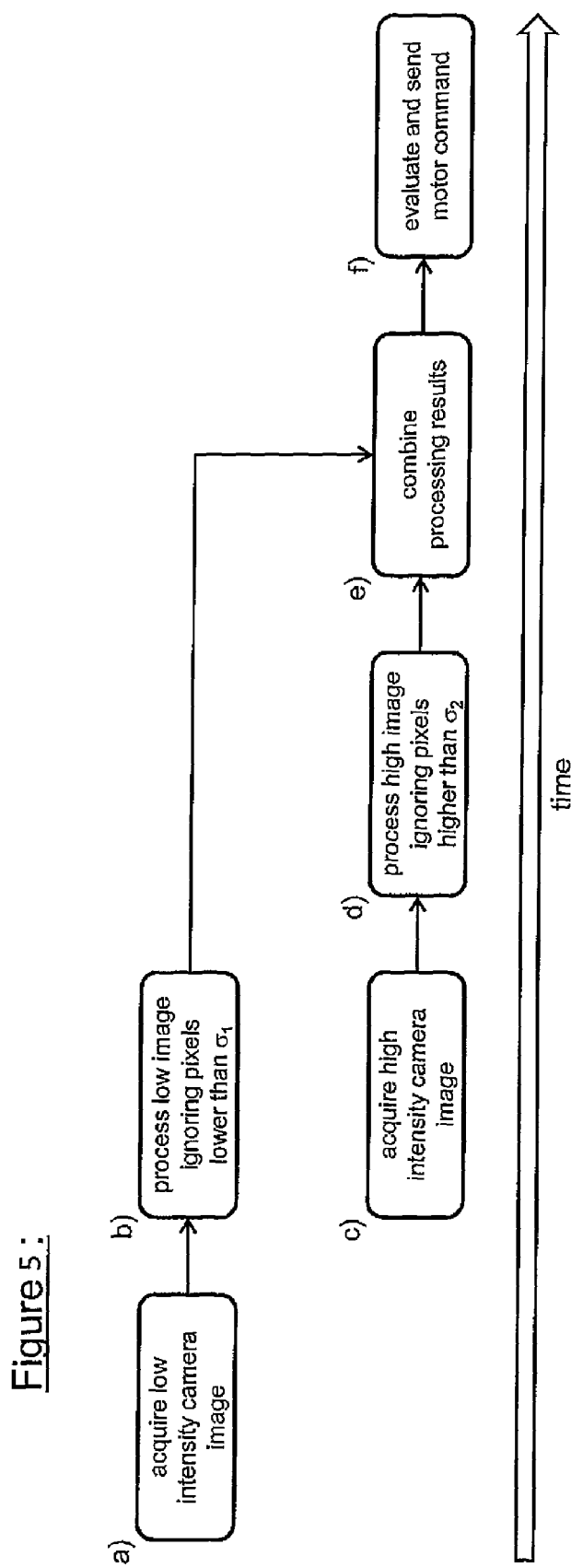
FIG. 5 a schematic for illustrating the processing of a low intensity camera image and a high intensity camera image where the processed images are combined.

Finally FIG. 4 shows an alternative to the method according to FIG. 3. Again at first there is acquired a low intensity camera image which is processed by ignoring pixels with intensity values lower than $\sigma_1$. Then, as soon as available a second intensity camera image is also processed as a high intensity image thereby ignoring the pixels with intensity values higher than $\sigma_2$. But before the control signal is generated the processed images are combined and the evaluation is then based on the combined information of the processed first and second images. This means that in the combination not the images themselves are combined as it is known from the prior art but only the information that is the result from the image processing including the detection of obstacles is combined. Thus, there is one information used to evaluate for example in order to determine an evasion strategy and forming the control signal based thereon that includes information about the obstacles that are detected in the first image and the obstacles that are detected in the second image. Although the processing of the two images has been performed individually the final generation of the control signal is based on the sum of the information which is the outcome of the processing.

It is evident that here again ignoring pixels with intensity values lower than $\sigma_1$ in the first captured image and ignoring pixels with high intensity values higher then $\sigma_2$ may be either performed before the low intensity image and the high intensity image are processed or that obstacles that are detected on the basis of all the pixels of either the first captured image or the second captured image are then evaluated with respect to the reliability of the basis of the intensity values of the corresponding pixels.

The invention claimed is:

1. Control system for an autonomous vehicle, the system comprising:
   an image capturing means for capturing at least a first image of the environment of the vehicle and a second image of the environment, wherein the images are captured in a close time relationship but with different image capturing parameters, a processing means 8 configured to obtain and process the images captured with different image capturing parameters separately and taking into consideration a first intensity threshold when processing the first image and a second, different intensity threshold when processing the second image, and a control means for generating and outputting a control signal on the basis of a result of the at least one of the processed images.

2. Control system according to claim 1, wherein the image capturing means is a stereo camera.

3. Control system according to claim 2, wherein the system comprises a camera controller for applying a first parameter set to one camera of the stereo camera and a second parameter set to the other camera of the stereo camera.

4. Control system according to claim 1, wherein the system is configured to capture two images using a bracketing technique.

5. Control system according to claim 4, wherein
the system comprises a camera controller which is configured to set parameters for image capturing such that the image capturing means captures images of high intensity and low intensity in an alternative fashion.

6. Control system according to claim 1, wherein
the processing means is configured to perform as image processing grass segmentation in order to determine obstacles on a lawn.

7. Control system according to claim 6, wherein
the first image is a low intensity image and obstacles that are determined in the first image and for which a number of corresponding pixels have an intensity value that is below the first threshold are ignored in further processing.

8. Control system according to claim 6, wherein
the second image is a high intensity image and obstacles that are determined in the second image and for which a number of corresponding pixels have an intensity value that exceeds the second threshold are ignored in further processing.

9. Control system according to claim 1, wherein
the control signal includes commands for controlling a movement means.

10. Control system according to claim 1, wherein
the processing means is configured to start processing as soon as it obtained an image.

11. Control system according to claim 1, wherein
the image capturing parameters include at least exposure or gain.

12. Control system according to claim 1, wherein
the processing means is configured to combine the processed first image and the processed second image.

13. An autonomous vehicle equipped with movement means and the control system according to claim 1.

14. The autonomous vehicle according to claim 13, wherein
the autonomous vehicle is a service robot.

15. The autonomous vehicle according to claim 13, wherein
the autonomous vehicle is a lawn mower.

16. The method according to claim 15, wherein
the two images are captured using a bracketing technique.

17. A method for generating a control signal for controlling a movement of an autonomous vehicle, said method comprising the steps of:
capturing at least a first image of the environment of the vehicle and a second image of the environment in a close time relationship using different image capturing parameters;
processing these images separately and taking into consideration a first intensity threshold when processing the first image and a second, different intensity threshold when processing the second image; and
generating and outputting a control signal on the basis of a result of the at least one of the processed images.

18. The method according to claim 17, wherein
a first parameter set is applied to one camera of a stereo camera and a second parameter set is applied to the other camera of the stereo camera.

19. The method according to claim 17, wherein
high intensity and low intensity images are captured in an alternative fashion.

20. The method according to claim 17, wherein
an obstacle detection is performed on the basis of the processed images.

21. The method according to claim 17, wherein
the first image is a low intensity image and obstacles that are determined in the first image and for which a number of corresponding pixels have an intensity value that is below the first threshold are ignored in further processing.

22. The method according to claim 17, wherein
the second image is a high intensity image and obstacles that are determined in the second image and for which a number of corresponding pixels have an intensity value that exceeds the second threshold are ignored in further processing.

23. The method according to claim 17, wherein
the processing of an image is started as soon as it is obtained by a processing means.

24. The method according to claim 17, wherein
the first processed image and the second processed image are combined before the control signal is generated an generation of the control signal is based on the combined first processed and second processed image.

* * * * *